United States Patent
Lemmons

(10) Patent No.: US 7,338,111 B2
(45) Date of Patent: Mar. 4, 2008

(54) TRAILER HAVING COMBINATION EXTRUDED PANEL/SHEET SIDES

(75) Inventor: Brian C. Lemmons, Katy, TX (US)

(73) Assignee: Vantage Trailers, Inc., Katy, TX (US)

( * ) Notice: Subject to any disclaimer, the term of this patent is extended or adjusted under 35 U.S.C. 154(b) by 115 days.

(21) Appl. No.: 11/223,581

(22) Filed: Sep. 9, 2005

(65) Prior Publication Data

US 2007/0057533 A1 Mar. 15, 2007

(51) Int. Cl.
*B60J 7/00* (2006.01)
(52) U.S. Cl. .............................. 296/186.1; 296/183.1; 105/409
(58) Field of Classification Search ............. 296/186.1, 296/183.1, 182.1, 191
See application file for complete search history.

(56) References Cited

U.S. PATENT DOCUMENTS

| | | | |
|---|---|---|---|
| 2,101,793 A | 12/1937 | Field | |
| 2,489,670 A | 11/1949 | Powell, Jr. | |
| 2,910,322 A | 10/1959 | Magor | |
| 3,608,955 A | 9/1971 | Tantlinger | |
| 3,655,087 A | 4/1972 | Lulsada | |
| 3,772,997 A | 11/1973 | Heap et al. | |
| 3,801,993 A | 4/1974 | Stalder | |
| 3,814,479 A | 6/1974 | Vornberger | |
| 3,815,307 A | 6/1974 | Tantlinger | |
| 4,159,143 A | 6/1979 | Proeschl | |
| 4,403,804 A | 9/1983 | Mountz et al. | |
| 4,425,001 A | 1/1984 | Mauri | |
| 4,542,933 A | 9/1985 | Bischoff | |
| 5,041,318 A | 8/1991 | Hulls | |
| 5,042,395 A | 8/1991 | Wackerle et al. | |
| 5,185,193 A | 2/1993 | Phenicie et al. | |
| 5,204,149 A | 4/1993 | Phenicie et al. | |
| 5,320,403 A | 6/1994 | Kazyak | |
| 5,338,080 A | 8/1994 | Janotik et al. | |
| 5,403,062 A | 4/1995 | Sjostedt et al. | |
| 5,449,081 A | 9/1995 | Sjostedt | |
| 5,472,290 A | 12/1995 | Hulls | |
| 5,488,770 A | 2/1996 | Yamada | |
| 5,613,726 A * | 3/1997 | Hobbs et al. ............. 296/186.1 |
| 5,664,826 A | 9/1997 | Wilkens | |
| 5,685,229 A | 11/1997 | Ohara et al. | |
| 5,741,042 A | 4/1998 | Livingston et al. | |
| 5,934,739 A | 8/1999 | Waldeck | |
| 6,065,261 A | 5/2000 | Fehr | |
| 6,095,715 A | 8/2000 | Hulls | |

(Continued)

OTHER PUBLICATIONS

Office Action for U.S. Appl. No. 11/537,415 dated Jun. 25, 2007.

(Continued)

*Primary Examiner*—Joseph D. Pape
(74) *Attorney, Agent, or Firm*—Smith IP Services, P.C.

(57) ABSTRACT

A trailer having sides with a combination of extruded panel and sheet material. A trailer wall construction for use as part of a trailer assembly includes at least one panel comprising spaced apart inner and outer shells, and at least one sheet. An edge of the sheet is attached to an edge of the panel. Another trailer wall construction includes a vertical side having a lower portion with spaced apart inner and outer shells, and an upper portion with only a single sheet thickness.

16 Claims, 3 Drawing Sheets

U.S. PATENT DOCUMENTS

| | | | |
|---|---|---|---|
| 6,224,125 B1 | 5/2001 | McCormack | |
| 6,224,144 B1 | 5/2001 | Viet-Salomon et al. | |
| 6,237,989 B1 | 5/2001 | Ammerlaan et al. | |
| 6,290,285 B1 | 9/2001 | McCormack | |
| 6,375,250 B1 | 4/2002 | McWilliams | |
| 6,425,626 B1 | 7/2002 | Kloepfer | |
| 6,502,895 B2 | 1/2003 | Taylor | |
| 6,513,297 B2 | 2/2003 | Kloepfer | |
| 6,669,271 B2 | 12/2003 | Booher | |
| 6,719,360 B1 | 4/2004 | Backs | |
| 6,793,273 B1 | 9/2004 | Tuerk | |
| 6,929,311 B2 | 8/2005 | Booher | |
| 6,979,051 B2 * | 12/2005 | Jones et al. | 296/186.1 |
| 7,014,252 B2 | 3/2006 | Booher | |
| 7,114,762 B2 * | 10/2006 | Smidler | 296/186.1 |
| 7,152,909 B2 | 12/2006 | Booher | |
| 7,178,860 B2 | 2/2007 | Lemmons | |
| 2001/0009085 A1 | 7/2001 | Boyer | |

OTHER PUBLICATIONS

Office Action for U.S. Appl. No. 11/537,448 dated Jun. 21, 2007.
Office Action for U.S. Appl. No. 11/566,091, dated Apr. 26, 2007.
Office Action issued for U.S. Appl. No. 11/537,415 dated Oct. 16, 2007 (6 pages).
Office Action issued for U.S. Appl. No. 11/566,091 dated Oct. 16, 2007 (12 pages).

* cited by examiner

TRAILER HAVING COMBINATION EXTRUDED PANEL/SHEET SIDES

BACKGROUND

The present invention relates generally to wheeled vehicle construction and, in an embodiment described herein, more particularly provides a trailer having sides which include a combination of extruded panel and sheet material.

Trailer walls have been constructed using sheet material in the past. Recently, it has become known that certain advantages are obtained by using hollow extruded panels in trailer wall construction. These advantages include, but are not limited to, increased strength, puncture resistance, wear resistance and aesthetic qualities.

An example of trailer wall construction utilizing hollow extruded panels is found in U.S. patent application Ser. No. 11/112,489, the entire disclosure of which is incorporated herein by this reference.

It will be readily appreciated, however, that sheet material still has certain advantages over extruded panels in trailer wall construction. Sheet material is less expensive than extruded panels, and can weigh less than extruded panels. Sheet material can be readily attached to other components of the wall construction without use of complex geometries or unconventional fastening methods.

Therefore, it may be seen that improvements are needed in the art of trailer wall construction. It is accordingly among the objects of the present invention to provide such improvements.

SUMMARY

In carrying out the principles of the present invention, a trailer wall construction is provided which solves at least one problem in the art. One example is described below in which a trailer assembly includes a vertical side wall with a hollow extruded panel used in a lower portion of the wall, and a sheet material used in an upper portion of the wall.

In one aspect of the invention, a trailer wall construction for use as part of a trailer assembly includes at least one panel with spaced apart inner and outer shells, and at least one sheet. An edge of the sheet is attached to an edge of the panel.

In another aspect of the invention, a trailer wall construction includes a vertical side having a lower portion with spaced apart inner and outer shells, and an upper portion with only a single sheet thickness.

These and other features, advantages, benefits and objects of the present invention will become apparent to one of ordinary skill in the art upon careful consideration of the detailed description of representative embodiments of the invention hereinbelow and the accompanying drawings, in which similar elements are indicated in the various figures using the same reference numbers.

DETAILED DESCRIPTION

It is to be understood that the various embodiments of the present invention described herein may be utilized in various orientations, such as inclined, inverted, horizontal, vertical, etc., and in various configurations, without departing from the principles of the present invention. The embodiments are described merely as examples of useful applications of the principles of the invention, which is not limited to any specific details of these embodiments.

Figure 1:
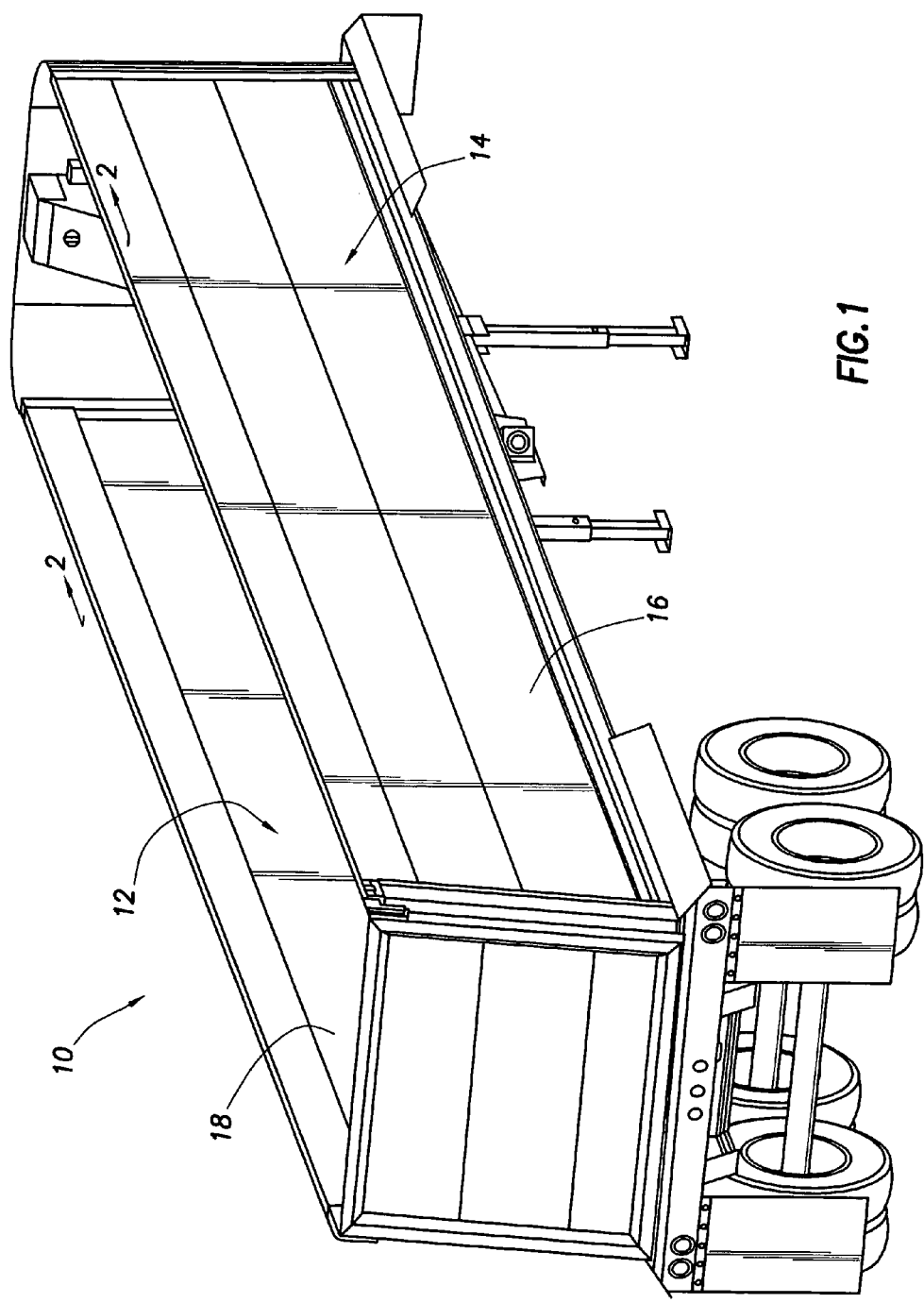
FIG. 1 is an isometric view of a trailer assembly embodying principles of the present invention.

Representatively illustrated in FIG. 1 is a trailer assembly 10 which embodies principles of the present invention. The trailer assembly 10 is representatively illustrated as being of the type known as a dump trailer, but it should be clearly understood that other types of trailers (such as box trailers, etc.) can incorporate principles of the invention.

The trailer assembly 10 includes vertical sides 12, 14 which are constructed in a unique manner described more fully below. The sides 12, 14 are lateral side walls of the trailer assembly 10, but it should be clearly understood that a front side, rear side, or any other side of a trailer could also incorporate principles of the invention.

The sides 12, 14 are uniquely constructed to take advantage of the particular qualities of materials, while minimizing the disadvantages of using those materials. Thus, a lower portion 16 of each side is made of a material (such as one or more extruded hollow panels) having inner and outer shells, and an upper portion 18 of each side is made of a material having only a single sheet thickness.

The lower portion 16 has the inner and outer shells to provide increased puncture resistance, wear resistance and strength, while the upper portion 18 has a single sheet thickness to provide reduced weight and cost, and convenient construction. It will be appreciated by those skilled in the art that the lower portion of a dump trailer side is most subject to punctures and wear, and requires increased strength to withstand loads applied thereto. The upper portion of a dump trailer side can be made of a lighter, less expensive material, since it is not subject to as much stress, wear, puncture danger, etc.

The term "sheet" as used herein indicates a material, such as sheet metal, which is only a single thickness and does not have voids or cavities therein. The upper portion 18 of the sides 12, 14 is preferably made of a relatively tough and durable aluminum alloy sheet material.

Note that sheet material could be used to form the inner and outer shells of the lower portion 16 of the sides 12, 14. However, the lower portion 16 is preferably made of an extruded aluminum alloy in which multiple cavities or voids are formed between webs connecting the inner and outer shells (see FIG. 3).

Figure 2:
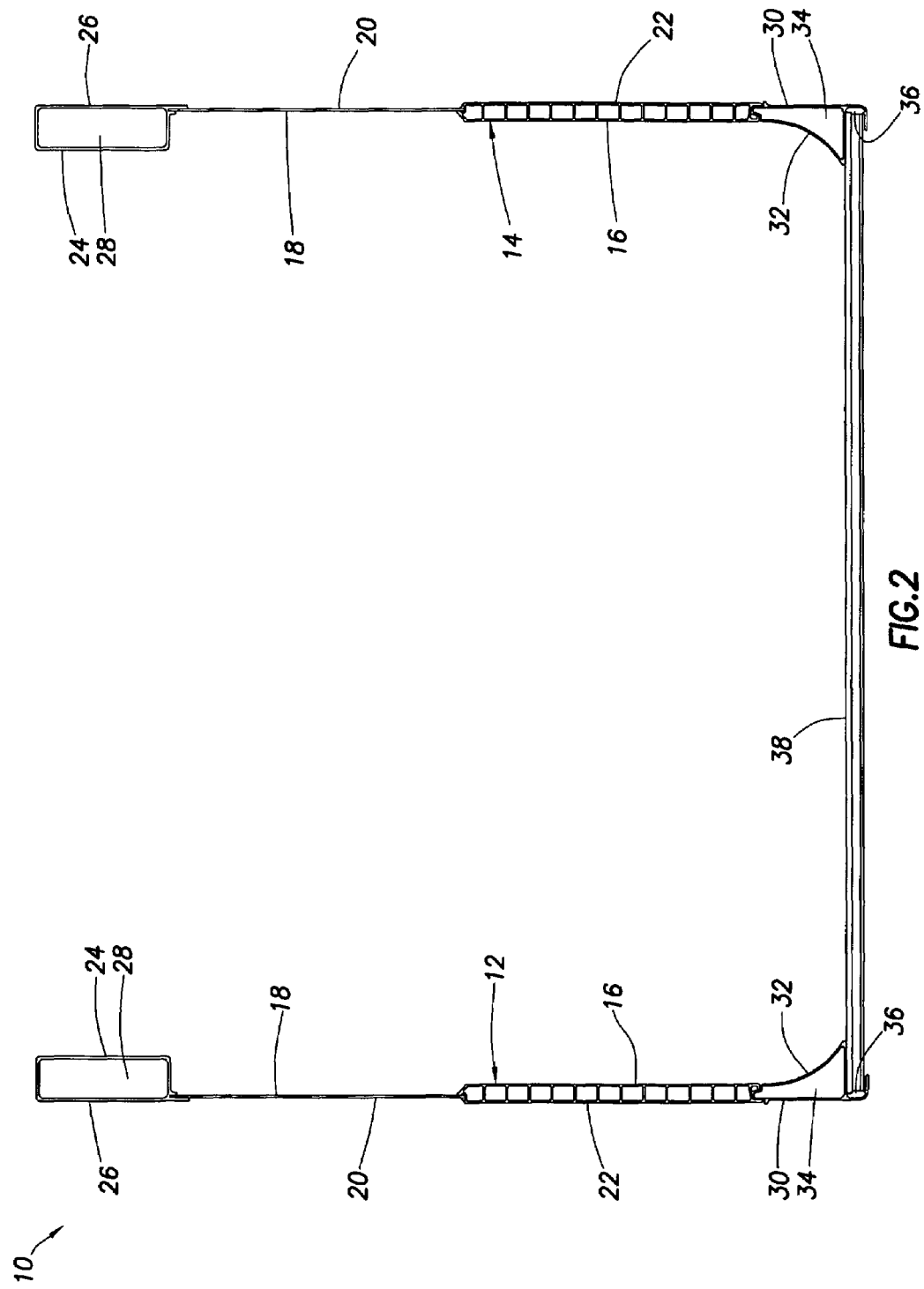
FIG. 2 is an enlarged scale cross-sectional view through the trailer assembly, taken along line 2-2 of FIG. 1.

Referring additionally now to FIG. 2, a cross-sectional view of the trailer assembly 10 is representatively illustrated. In this view the manner in which the sides 12, 14 are constructed can be more clearly seen. Certain components of the trailer assembly 10 (such as undercarriage, suspension, etc.) are not shown in FIG. 2 for illustrative clarity.

As depicted in FIG. 2, the upper portion 18 includes a single sheet 20, but it should be understood that the upper portion could include multiple sheets if desired. If multiple sheets are used, the sheets could be vertically or horizontally arranged as desired.

The lower portion 16 includes a single panel 22, but it should be understood that the lower portion could include multiple panels if desired. If multiple panels are used, the panels could be connected to each other in various ways, including any of those described in the incorporated U.S. patent application Ser. No. 11/112,489.

The sheet 20 is attached to the panel 22 along generally horizontally extending edges of these components. However, note that it is not necessary for these edges to be horizontal. The edges could instead be inclined vertically somewhat, etc., if desired.

A top rail 24 is attached to a generally horizontally extending upper edge of the sheet 20 in each of the sides 12, 14. The top rail 24 has an external shell 26 with a hollow cavity 28 therein. It will be appreciated that in a dump trailer the top rail 24 will likely be subject to increased impact, wear and puncture danger as compared to the remainder of the upper portion 18, and so the use of a hollow extruded aluminum top rail is preferred at this location.

A bottom rail 30 is attached to a generally horizontally extending lower edge of the panel 22 in each of the sides 12, 14. The bottom rail 30 has an external shell 32 with a hollow cavity 34 therein. In addition, a recess 36 is provided in each bottom rail 30 for attachment of a floor 38 thereto. It will be appreciated that the bottom rail 30 will be subject to impact, wear, puncture danger, and stresses due to its use in connecting the sides 12, 14 to the floor, and so the use of a hollow extruded aluminum bottom rail is preferred at this location.

Figure 3:
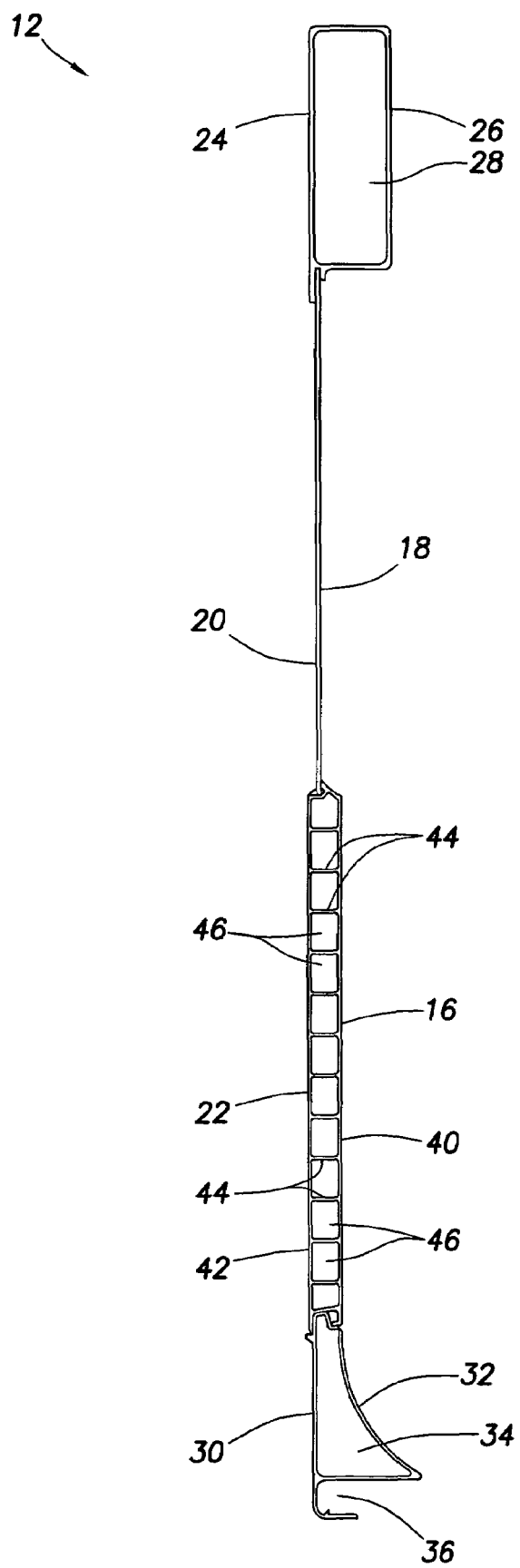
FIG. 3 is an enlarged scale cross-sectional view of a trailer wall construction embodying principles of the invention.

Referring additionally now to FIG. 3, an enlarged cross-sectional view of the side 12 is depicted, apart from the remainder of the trailer assembly 10. In this view the manner in which the top rail 24, sheet 20, panel 22 and bottom rail 30 are attached to each other can be more clearly seen.

Preferably, an upper edge of the sheet 20 is received in a recess or slot in a bottom side of the top rail 24. A lower edge of the sheet 20 is attached to an upper edge of the panel 22. An upper edge of the bottom rail 30 is received in a recess or slot in a bottom edge of the panel 22.

At each of these attachments between components of the side 12, the components are preferably welded to each other along their respective edges. However, it should be clearly understood that other attachment methods may be used instead of, or in addition to, welding. For example, adhesive bonding, mechanical fasteners, or any other type of attachment method or combination of attachment methods may be used.

In this enlarged view of the side 12, the construction of the panel 22 may also be seen more clearly. The panel 22 is preferably constructed with an inner shell 40 spaced apart from an outer shell 42, with multiple webs 44 connecting the shells to each other.

The webs 44 separate multiple internal hollow cavities 46. It is not necessary for the cavities 46 or the other cavities 28, 34 to be hollow, since they could instead be filled with substances, such as foam, plastics, etc. to further strengthen the panel 22 and top and bottom rails 24, 30.

Although the inner shell 40 is depicted in FIG. 3 as having approximately the same thickness as the outer shell 42, these shells could have different thicknesses. For example, the inner shell 40 could be made thicker to provide increased wear resistance, puncture resistance and strength.

Of course, a person skilled in the art would, upon a careful consideration of the above description of representative embodiments of the invention, readily appreciate that many modifications, additions, substitutions, deletions, and other changes may be made to these specific embodiments, and such changes are within the scope of the principles of the present invention. Accordingly, the foregoing detailed description is to be clearly understood as being given by way of illustration and example only, the spirit and scope of the present invention being limited solely by the appended claims and their equivalents.

What is claimed is:

1. A trailer wall construction for use as part of a trailer assembly, the trailer wall construction comprising:
   at least one panel comprising spaced apart inner and outer shells; and
   at least one sheet, an edge of the sheet being attached to an edge of the panel, and inner and outer surfaces of the sheet forming respective interior and exterior surfaces of the trailer wall construction, thereby forming a single sheet thickness portion of the trailer wall construction,
   wherein the sheet is positioned vertically between the panel and a top rail, and
   wherein the top rail includes at least one hollow cavity within an external shell.

2. The trailer wall construction of claim 1, wherein the panel and the sheet are aligned in a vertical plane.

3. The trailer wall construction of claim 1, wherein the panel and sheet edges extend horizontally.

4. The trailer wall construction of claim 3, wherein the sheet is positioned vertically above the panel.

5. The trailer wall construction of claim 1, wherein a generally horizontally extending edge of the top rail is attached to the sheet.

6. The trailer wall construction of claim 1, wherein the panel includes multiple hollow cavities separated by internal webs connecting the inner and outer shells to each other.

7. The trailer wall construction of claim 1, wherein the panel is positioned vertically between the sheet and a bottom rail.

8. A trailer wall construction for use as part of a trailer assembly, the trailer wall construction comprising:
   at least one panel comprising spaced apart inner and outer shells; and
   at least one sheet, an edge of the sheet being attached to an edge of the panel, and inner and outer surfaces of the sheet forming respective interior and exterior surfaces of the trailer wall construction, thereby forming a single sheet thickness portion of the trailer wall construction,
   wherein the panel is positioned vertically between the sheet and a bottom rail, and
   wherein the bottom rail includes at least one hollow cavity within an external shell.

9. The trailer wall construction of claim 8, wherein the panel includes multiple hollow cavities separated by internal webs connecting the inner and outer shells to each other.

10. A trailer wall construction for use as part of a trailer assembly, the trailer wall construction comprising:
    a vertical side including:
      a lower portion with spaced apart inner and outer shells, and
      an upper portion with only a single sheet thickness, and inner and outer surfaces of the sheet forming respective interior and exterior surfaces of the vertical side, so that the vertical side only has the single sheet thickness at the upper portion,
    wherein the upper portion is positioned vertically between the lower portion and a top rail, and
    wherein the top rail includes at least one hollow cavity within an external shell.

11. The trailer wall construction of claim 10, wherein the upper portion is attached to the lower portion along generally horizontally extending edges.

12. The trailer wall construction of claim 10, wherein the upper portion is made of a solid sheet material, and wherein the lower portion is made of an at least partially hollow material.

13. The trailer wall construction of claim 10, wherein the lower portion includes multiple hollow cavities separated by internal webs connecting the inner and outer shells to each other.

14. The trailer wall construction of claim 10, wherein the lower portion is positioned vertically between the upper portion and a bottom rail.

15. A trailer wall construction for use as part of a trailer assembly, the trailer wall construction comprising:

a vertical side including:
    a lower portion with spaced apart inner and outer shells, and
    an upper portion with only a single sheet thickness, and inner and outer surfaces of the sheet forming respective interior and exterior surfaces of the vertical side, so that the vertical side only has the single sheet thickness at the upper portion,
wherein the lower portion is positioned vertically between the upper portion and a bottom rail, and
wherein the bottom rail includes at least one hollow cavity within an external shell.

16. The trailer wall construction of claim 15, wherein the lower portion includes multiple hollow cavities separated by internal webs connecting the inner and outer shells to each other.

* * * * *